(12) United States Patent
Liderman et al.

(10) Patent No.: US 11,108,556 B2
(45) Date of Patent: Aug. 31, 2021

(54) UNMANAGED SECURE INTER-APPLICATION DATA COMMUNICATIONS

(71) Applicant: VMware, Inc., Palo Alto, CA (US)

(72) Inventors: Eugene Liderman, Olney, MD (US); Stephen Louis Turner, Atlanta, GA (US); Simon Brooks, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 175 days.

(21) Appl. No.: 16/004,013

(22) Filed: Jun. 8, 2018

(65) Prior Publication Data

US 2019/0379540 A1 Dec. 12, 2019

(51) Int. Cl.
*H04L 9/30* (2006.01)
*H04L 9/32* (2006.01)
(Continued)

(52) U.S. Cl.
CPC .................. *H04L 9/30* (2013.01); *G06F 9/54* (2013.01); *H04L 9/0643* (2013.01); *H04L 9/088* (2013.01); *H04L 9/3263* (2013.01)

(58) Field of Classification Search
CPC ......... H04L 9/30; H04L 9/0643; H04L 9/088; H04L 9/3263; H04L 9/3268; G06F 9/54
See application file for complete search history.

(56) References Cited

U.S. PATENT DOCUMENTS 9,742,559 B2 *   8/2017   Christodorescu ..... H04L 63/061
2004/0006603 A1 * 1/2004   Haury ....................... G06F 9/54
                                                  709/207
(Continued)

FOREIGN PATENT DOCUMENTS

WO     2013009120 A2     1/2013
WO     WO-2013009120 A3 * 3/2013  ............ H04W 12/06

OTHER PUBLICATIONS

Alfred Menezes et al. "Handbook of Applied Cryptography" (C)1997 CRC Press (780 pages) (Year: 1997).*
(Continued)

*Primary Examiner* — Joseph P Hirl
*Assistant Examiner* — Thomas A Gyorfi
(74) *Attorney, Agent, or Firm* — Thomas | Horstemeyer LLP (57) ABSTRACT

Aspects of secure inter-application data communications are described. In one example, a first application executing on a computing device obtains an identity certificate. The identity certificate can include a unique identifier of the computing device and a public key of the first application. To obtain the public keys of other applications executing on the computing device, the first application can query a management computing environment using the identity certificate. Once the computing device is authenticated by the management computing environment, the management computing environment can store the public key of the first application and return any public keys of other applications executing on the computing device. Once the public keys have been exchanged between the applications, the applications can encrypt and sign data packages for secure data communications between each other.

20 Claims, 5 Drawing Sheets

(51) Int. Cl.
*H04L 9/06* (2006.01)
*H04L 9/08* (2006.01)
*G06F 9/54* (2006.01)

(56) References Cited

U.S. PATENT DOCUMENTS

| | | | |
|---|---|---|---|
| 2006/0080527 A1* | 4/2006 | Novack | H04L 9/3263 713/156 |
| 2008/0046755 A1* | 2/2008 | Hayes | G06F 9/54 713/187 |
| 2011/0078447 A1* | 3/2011 | Novack | H04L 9/3263 713/175 |
| 2013/0326219 A1* | 12/2013 | Badam | G09C 1/00 713/168 |
| 2014/0258711 A1* | 9/2014 | Brannon | H04L 9/006 713/156 |
| 2015/0319143 A1* | 11/2015 | Kim | G06F 21/6281 713/171 |
| 2016/0277191 A1* | 9/2016 | Lee | H04W 12/04 |
| 2017/0269963 A1* | 9/2017 | Quinlan | G06F 9/485 |
| 2017/0286614 A1* | 10/2017 | Morris | H04L 9/0891 |

OTHER PUBLICATIONS

D. Cooper et al. "RFC5280: Internet X.509 Public Key Infrastructure Certificate and Certificate Revocation List (CRL) Profile" (C) 2008 The IETF Trust. (151 pages) https://tools.ietf.org/pdf/rfc5280.pdf (Year: 2008).*

International Search Report mailed for Application No. PCT/US2019/036120.

* cited by examiner

UNMANAGED SECURE INTER-APPLICATION DATA COMMUNICATIONS

BACKGROUND

The operating systems of computing devices typically provide various mechanisms for data communication between applications or processes executing on the devices. These mechanisms may be referred to as inter-process communication (IPC) mechanisms, for example, or other related terms. Some forms of IPC mechanisms also facilitate the division of processing requirements among the processes.

In some cases, applications that rely upon IPC mechanisms can be categorized as clients or servers. Under that construct, a client can be an application or a process that requests a service from some other application or process. A server, on the other hand, is an application or a process that responds to a client request. Applications can act as both clients and servers, depending on the situation.

With the growing number of different mobile computing devices, platforms, and operating systems available for adoption, a number of challenges arise in the management of large numbers of mobile devices for many users. One challenge is the need to achieve secure communications between two different computing devices. Some mobile device management (MDM) platforms provide features that help to achieve secure communications between different computing devices and, in some cases, between two different applications or processes executing on the same computing device. Thus, the use of MDM platforms can help to achieve secure IPC mechanisms.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

As noted above, some MDM platforms provide features that help to achieve secure communications between different computing devices and, in some cases, between two different applications or processes executing on the same computing device. However, MDM platforms cannot be relied upon to achieve secure inter-application communications in all cases and between all applications. It would be beneficial to offer other solutions for secure inter-application communication processes among two or more applications executing on the same computing device, particularly on an unmanaged computing device.

On certain computing devices, keychain or keystore services can be relied upon to provide a mechanism for applications to store data in an encrypted database called a keychain. The keychain can be relied upon to store sensitive data, such as passwords, credit card information, cryptographic keys, cryptographic certificates, and other types of sensitive data. However, keychain services are also not tailored or designed to provide secure inter-application communication processes on managed or unmanaged devices.

In the context outlined above, the embodiments described herein provide a mechanism for secure inter-application communications between a number of different processes or applications executing on the same computing device. In one example, an application executing on a computing device generates an asymmetric key pair and obtains an identity certificate from a certificate authority based on the key pair. The identity certificate can include a unique identifier of the computing device upon which the application is executing, along with a public key of the first application. Other applications executing on the same computing device can also generate asymmetric key pairs and obtain identity certificates, each including the same unique identifier for the computing device, based on the key pairs.

The applications executing on the computing device can then exchange their public keys with each other to facilitate secure inter-application communications between each other. To exchange their public keys with each other, each of the applications can query a management computing environment using its identity certificate for authentication. The unique identifier in the identity certificates can be relied upon by the management computing environment to identify the computing device upon which the applications are executing. The unique identifier can also be relied upon to uniquely identify the computing device and distinguish it from other computing devices. Once the management computing environment authenticates the applications, the management computing environment can then store the public keys from the identity certificates of the applications in a mapping table or memory area specific to the computing device upon which the applications are executing.

For each application that queries the management computing environment, the management computing environment can also return any public keys of other applications stored in the mapping table. Each application can maintain a local copy of the public keys of the other applications in a local key store memory area. Once the public keys have been exchanged between the applications, the applications can encrypt and sign data packages for secure data communications between each other as described in further detail below.

Figure 1:
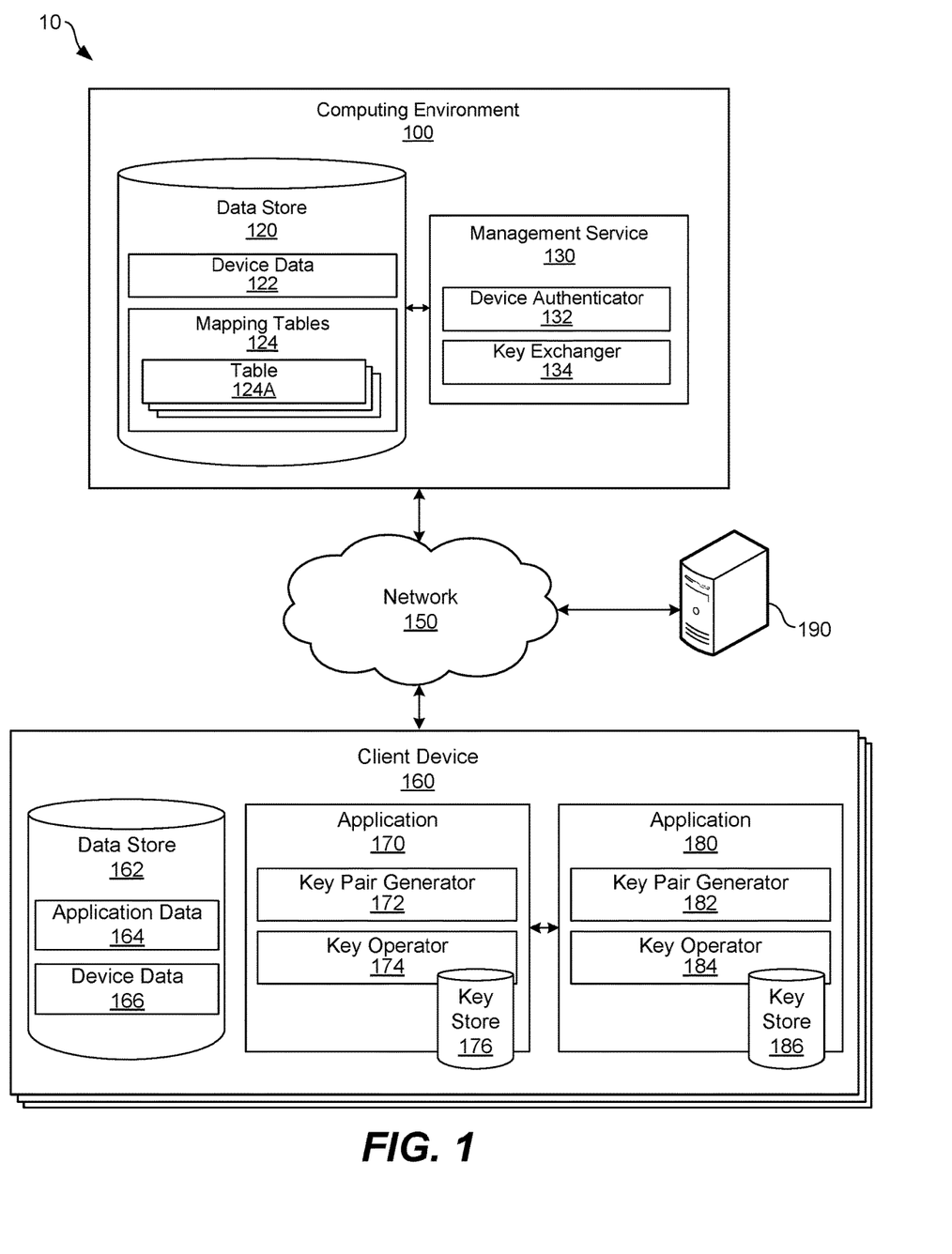
FIG. 1 illustrates an example networked environment for secure inter-application data sharing according to various examples described herein.

Turning to the drawings, the following paragraphs provide an outline of a networked environment followed by a discussion of the operation of the same. FIG. 1 illustrates an example networked environment for secure inter-application data sharing according to various examples described herein. The networked environment 10 includes a computing environment 100, a network 150, a client device 160, and a certificate authority 190. The networked environment 10 is provided as a representative example for purposes of discussion. The networked environment 10 can include other networked components not illustrated in FIG. 1.

The computing environment 100 can be embodied as one or more computers, computing devices, or computing systems. In certain embodiments, the computing environment 100 can include one or more computing devices arranged, for example, in one or more server or computer banks. The computing device or devices can be located at a single installation site or distributed among different geographical locations. The computing environment 100 can include a plurality of computing devices that together embody a hosted computing resource, a grid computing resource, or other distributed computing arrangement. In some cases, the computing environment 100 can be embodied as an elastic computing resource where an allotted capacity of processing, network, storage, or other computing-related resources varies over time. As further described below, the computing environment 100 can also be embodied, in part, as certain functional or logical (e.g., computer-readable instruction) elements or modules as described herein.

The computing environment 100 can function as a type of management service for the client device 160, among other devices. In that context, the computing environment 100 includes a data store 120 and a management service 130. The data store 120 includes areas in memory for the storage of device data 122 and mapping tables 124, among other types of data. The management service 130 includes a device authenticator 132 and a key exchanger 134, among other components.

The management service 130 can enroll the client device 160, among others, for device management services (e.g., MDM services), although it is not necessary for the management service 130 to enroll the client device 160 for management services to achieve the benefits of secure inter-application communications as described herein. That is, the concepts of secure inter-application communications described herein can be achieved on client devices that are not managed by a management service (i.e., "unmanaged devices").

The certificate authority 190 can be embodied as one or more computers, computing devices, or computing systems similar to the computing environment 100 but directed to a different function or purpose. The certificate authority 190 can operate as a certificate authority for the computing environment 100, the client device 160, and other computing devices on the network 150. In that context, the certificate authority 190 is configured to issue identity certificates, digital certificates, and other certificates that can be relied upon to authenticate the identity of one or more devices in the networked environment 10. An identity or digital certificate can be relied upon to certify or authenticate the ownership of a public key. In that sense, the certificate authority 190 can operate as a trusted third party between the computing environment 100, client device 160, and the applications 170 and 180 executing on the client device 160. The identity or digital certificates generated by the certificate authority 190 can take any suitable format, such as that defined by the X.509 standard, among others.

The certificate authority 190 can also maintain data related to the revocation status of public keys and certificates. A public key or certificate can be irreversibly revoked, for example, if the certificate authority certificate authority 190 had improperly issued a certificate or a private key has been compromised or stolen. Public keys or certificates can also be revoked for a failure of the owner to adhere to certain security policies or requirements, such as the publication of false data, misrepresentations, or violations of other policies specified by the certificate authority 190.

The network 150 can include the Internet, intranets, extranets, wide area networks (WANs), local area networks (LANs), wired networks, wireless networks, cable networks, satellite networks, other suitable networks, or any combinations thereof. As one example, the computing environment 100, the client device 160, and the certificate authority 190 can be respectively coupled to one or more public or private LANs or WANs and, in turn, to the Internet for communication of data among each other. Although not shown in FIG. 1, the network 150 can also include network connections to any number and type of network hosts or devices, such as web site servers, file servers, cloud computing resources, databases, data stores, or any other network or computing architectures.

In the networked environment 10, the computing environment 100, the client device 160, and the certificate authority 190 can communicate data among each other using one or more network transfer protocols or interconnect frameworks, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), other protocols and interconnect frameworks, and combinations thereof.

The client device 160 is representative of one or more client devices. The client device 160 can be embodied as any computing device, processing circuit, or processor based device or system, including those in the form of a desktop computer, a laptop computer, a tablet computer, a personal digital assistant, a cellular telephone, a wearable computing device, or a set-top box, among other example computing devices and systems. Depending upon its primary purpose or function, for example, the client device 160 can include various peripheral devices or components. The peripheral devices can include input or communications devices or modules, such as keyboards, keypads, touch pads, touch screens, microphones, cameras, wireless communications modules (e.g., infra-red, WI-FI, or BLUETOOTH®), buttons, switches, or sensors. The peripheral devices can also include a display, indicator lights, speakers, global positioning system (GPS) circuitry, accelerometers, gyroscopes, or other peripheral devices depending upon the primary purpose or function of the client device 160.

As illustrated in FIG. 1, the client device 160 includes a data store 162, having areas for the storage of application data 164 and device data 166, among other types of data. The client device 160 also includes the applications 170 and 180, which are installed and configured for execution on the client device 160. As described in further detail below, the applications 170 and 180 (among others) can securely communicate encrypted data packages between each other using inter-application communication processes.

The application data 164 can include data related to any applications associated with the client device 160, such as the executable code of the applications 170 and 180, among others, installed on the client device, user data associated with the applications 170 and 180, and other related data. The device data 166 can include various types of data associated with the client device 160, including a unique identifier of the client device 160. The unique identifier can be generated by an operating system of the client device 160, generated by one of the applications 170 or 180, or provided to the client device 160 by the management service 130 or some other computing device or environment.

The applications 170 and 180 are representative of any applications, application extensions, or other application-related components that can be executed on the client device 160. The client device 160 can also execute a number of other applications in addition to the applications 170 and 180. The applications 170 and 180 can include hypertext-based network browsers, such as the Internet Explorer®, Firefox®, Chrome®, Safari®, or Silk® browsers, among other types of browsers. Alternatively, the applications 170 and 180 can be embodied as other types of applications, such as an e-mail clients, messaging clients, document editors or viewers, file browsers, or other applications or application extensions for other purposes.

The application 170 includes a key pair generator 172, a key operator 174, and a key store 176. Similarly, the application 180 includes a key pair generator 182, a key operator 184, and a key store 186. The key pair generator 172 is configured to generate one or more asymmetric public and private key pairs. The key operator 174 can use one or more of the key pairs to perform various cryptographic operations, including operations to facilitate secure inter-application communications between the applications 170 and 180, among others, as described herein.

Key pairs generated by the key pair generator 172 can be stored in the key store 176. The key store 176 can be embodied as a local memory area in the client device 160 reserved for use only by the application 170. The key store 176 can be used to store sensitive data, such as passwords, credit card information, cryptographic keys, cryptographic certificates, and other types of sensitive data. In one example, the key store 176 can be a sandboxed or private area of the data store 162. The key store 176 can be reserved by the operating system of the client device 160 for use only by the application 170. The key store 176 can also be embodied as a keychain managed for the application 170 by the operating system of the client device 160. In addition to storing key pairs generated by the key pair generator 172, the key store 176 can also store public keys generated by other applications, such as the application 180, among others executing on the client device 160. The key store 186 of the application 180 is similar to the key store 176 of the application 170, and the key store 186 can be used to securely store data for use by the application 180.

As noted above, the key operator 174 is configured to perform a number of cryptographic operations using the key pairs generated by the key pair generator 172. The cryptographic operations can include encryption, decryption, verification, signature, and other operations. The key operator 174 is also configured to obtain one or more public key, identity, or digital certificates for the application 170 based on communications with the certificate authority 190. Such certificates can be based on the X.509 standard or other related standards or protocols. An example identity certificate obtained from the certificate authority 190 can include both the public key of the key pair generated by the key operator 174 and a unique identifier for the client device 160. The key operator 184 of the application 180 is configured to perform operations similar to those performed by the key operator 174. Thus, the key operator 184 is configured to obtain one or more public key, identity, or digital certificates for the application 180 based on communications with the certificate authority 190 and the key pair generated for the application 180 by the key pair generator 182.

Another function of the key operator 174 is to encrypt and decrypt data for secure communications between other applications executing on the client device 160. In that context, the key operator 174 is configured to encrypt and decrypt data using the key pair generated by the key pair generator 172. Similarly, the key operator 184 is configured to encrypt and decrypt data using the key pair generated by the key pair generator 182.

The key operator 174 is not limited to performing cryptographic operations with the key pair generated by the key pair generator 172, however. Instead, the key operator 174 can also perform cryptographic operations using the public keys of other applications executing on the client device 160, including the application 180. The key operator 184 can also perform cryptographic operations using the public keys of other applications executing on the client device 160, including the application 170. Thus, the key operator 174 of the application 170 and the key operator 184 of the application 180 are also configured to encrypt and decrypt data using the public keys of other applications executing on the client device 160. As one example, the key operator 174 can encrypt data for communication to the application 180 using the public key of the application 180. The encrypted data can then be securely communicated to the application 180, and the key operator 184 of the application 180 can then decrypt the encrypted data using the private key of the application 180.

However, before the key operator 174 can conduct cryptographic operations using the public keys of other applications executing on the client device 160 (e.g., the public key of the application 180, among other public keys), it is necessary for the application 170 to obtain copies of the public keys of those other applications. It is also necessary for the application 180 to obtain copies of the public keys of the other applications executing on the client device 160. To that end, the management service 130 of the computing environment 100 operates as a type of application authenticator, public key repository, and public key exchanger for the applications executing on the client device 160. According to an example described herein, the applications 170 and 180 are able to conduct secure inter-application communications between each other, in part, by sharing and exchanging their public keys through the management service 130 on the computing environment 100.

For the application 170 to obtain the public keys of the other applications executing on the client device 160, the key operator 174 is configured to query the management service 130 to authenticate itself. The key operator 174 can forward the identity certificate for the application 170 as part of the query. As noted above, the identity certificate of the application 170 includes the public key of the application 170 as well as a unique identifier of the client device 160. Using the identity certificate of the application 170 and information stored in the device data 122, the device authenticator 132 of the management service 130 can authenticate the application 170 in connection with a digital certificate contained in the identity certificate. The authentication can be conducted based on communications with the certificate authority 190 in some cases. The device authenticator 132 can also uniquely identify the client device 160 upon which the application 170 is executing with reference to the unique identifier of the client device 160 and information stored in the device data 122.

Once the application 170 is authenticated by the device authenticator 132, the management service 130 can create and store data in a record for the application 170 in one of the mapping tables 124 for the client device 160. For example, the table 124A can be specifically reserved by the management service 130 for the client device 160 based on the unique identifier for the client device 160 received in the identity certificate from the application 170. Thus, the management service 130 can store a record for the application 170 in the table 124A. The record can include a number of data elements associated with the application 170, including the identity certificate, the public key, or both the identity certificate and the public key of the application 170, among other data elements. In a similar way, the management service 130 can use the table 124A to store other records for other applications executing on the client device 160. The mapping tables 124 can also include other tables for client devices other than the client device 160.

The key operator 184 of the application 180 is similar to the key operator 174 of the application 170 and can be relied upon by the application 180 to perform operations similar to those performed by the key operator 174. Thus, the key operator 184 can obtain public key, identity, or digital certificates for the application 180 from the certificate authority 190 based on the key pair generated by the key pair generator 182. The key operator 184 can also authenticate itself with the management service 130 though a query to the management service 130 using an identity certificate including the unique identifier of the client device 160 and the public key of the application 180. The key operator 184 can also share the public key of the application 180 with the management service 130, and the management service 130 can store the public key of the application 180 in the table 124A. As each application executing on the client device 160 (e.g., the applications 170 and 180, among others) authenticates itself with the device authenticator 132, the management service 130 can store all the public keys of the applications in the table 124A.

When the key operator 174 of the application 170 checks in and authenticates itself with the management service 130, it can also query the management service 130 for the public keys of other applications executing on the client device 160. In turn, the key exchanger 134 can access the table 124A, retrieve copies of the public keys stored in the table 124A for all the other applications executing on the client device 160, and return the copies of the public keys to the key operator 174 of the application 170. The key operator 174 can then store the public keys of the other applications in the key store 176. In that way, the key operator 174 can obtain copies of the public keys of the application 180, among others that are executing on the client device 160, from the computing environment 100. The key operator 184 of the application 180 can also obtain copies of the public keys of the application 170, among others, from the computing environment 100 in a similar way.

After the application 170 has a copy of the public key of the application 180 and the application 180 has a copy of the public key of the application 170, the applications 170 and 180 can encrypt data packages to send to each other. The applications 170 and 180 can also communicate the encrypted data packages to each other through any suitable inter-application communication process available on the client device 160. The manner in which the applications 170 and 180 can securely communicate with each other is described in further detail below with reference to the process flow diagrams of FIGS. 3A-3C.

Figure 2:
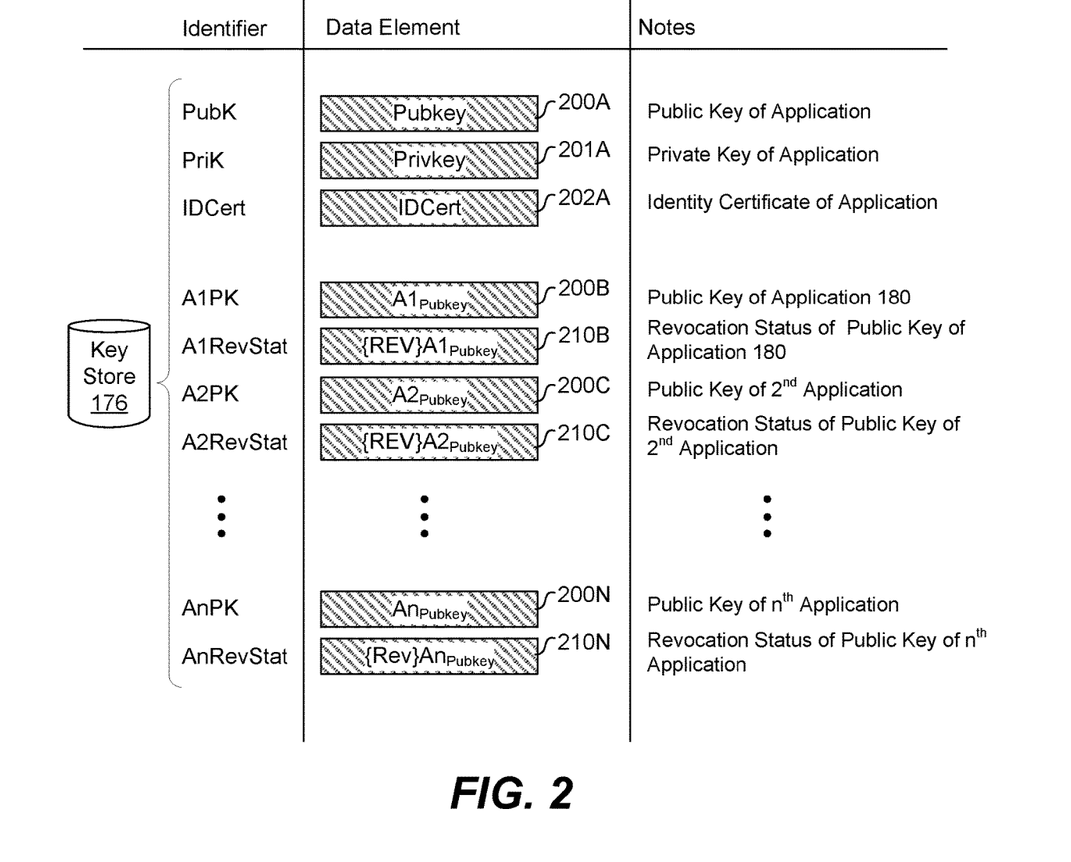
FIG. 2 illustrates example data elements stored in a local key store of an application executing on the client device in the networked environment shown in FIG. 1 according to various examples described herein.

FIG. 2 illustrates example data elements stored in the local key store 176 of the application 170. The local key store 176 can store other data elements in addition to those shown in FIG. 2. In other cases, the local key store 176 can omit (i.e., not store) one or more of the data elements shown in FIG. 2. The local key store 186 can include data elements similar to those shown in FIG. 2 for the local key store 176. Additionally, each of the mapping tables 124, including the mapping table 124A, can include data elements similar to those shown in FIG. 2.

For the application 170, the local key store 176 includes the public key 200A and the private key 201A. Together, the public key 200A and the private key 201A form the asymmetric key pair generated by the key pair generator 172. The local key store 176 also includes the identity certificate 202A of the application 170. As described above, the identity certificate 202A can be provided by the certificate authority 190 and, among other data, include the public key 200A and a unique identifier of the client device 160.

The local key store 176 can also include public keys of other applications executing on the client device 160. These public keys can be obtained from the management service 130 of the computing device, as described herein. In the example shown in FIG. 2, the local key store 176 also includes the public keys 200B-200N. The public key 200B can be the public key of the application 180, for example, and the public keys 200C-200N can be the public keys of other applications executing on the client device 160. In another embodiment, the local key store 176 can store the identity certificates of the application 180 and other applications executing on the client device 160. Thus, in addition or as an alternative to the public keys 200C-200N, the local key store 176 can store the identity certificates of the other applications executing on the client device 160.

The local key store 176 also includes the revocation status data 210B-210N. The revocation status data 210B is associated with the public key 200B, the revocation status data 210C is associated with the public key 200C, and so on. The revocation status data 210B can be relied upon by the key operator 174 to determine whether or not the public key 200B of the application 180 is valid for use or has been revoked for use. Thus, the revocation status data 210B defines the revocation status of the public key 200B. The manner in which the application 170 obtains and uses the revocation status data 210B-210N is described in further detail below.

Turning to a detailed description of the operations of the components described in FIG. 1, FIGS. 3A-3C illustrate a process for secure inter-application data sharing according to various examples described herein. The process is described in connection with the applications 170 and 180 of the client device 160 and the management service 130 shown in FIG. 1, although other applications and services can perform the process. Although the process diagrams show an order of operation or execution, the order can differ from that which is shown. For example, the order of execution of two or more process steps can be switched relative to the order shown or as described below. Also, two or more process steps shown in succession can be executed concurrently or with partial concurrence. Further, in some examples, one or more of the process steps shown in the process diagrams can be skipped or omitted.

Figure 3A:
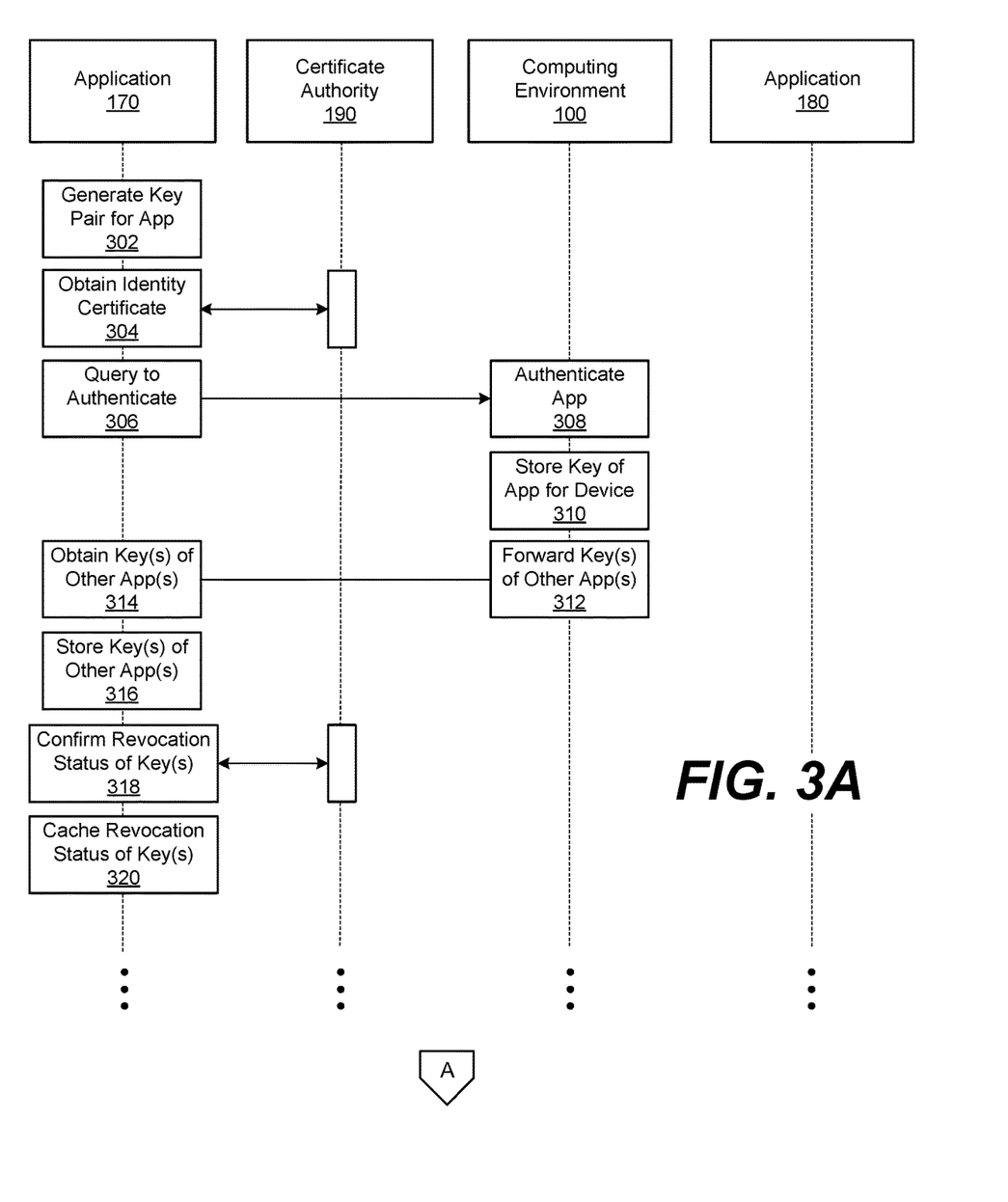
FIG. 3A illustrates a process for secure inter-application data sharing according to various examples described herein.

At step 302, the process can include the key pair generator 172 generating an asymmetric key pair for the application 170. Any suitable type or length of key pair can be generated by the key pair generator 172. As an example, key pairs can be randomly generated using a random number generator (RNG) or pseudorandom number generator (PRNG). Using the key pair, the key pair generator 172 can conduct cryptographic operations using one or more cryptosystems, such as the Diffie-Hellman, Rivest-Shamir-Adleman (RSA), and digital signature algorithm (DSA) cryptosystems, among others.

At step 304, the process can include the key operator 174 obtaining an identity certificate for the application 170 from the certificate authority 190. To do so, the key operator 174 can submit a certification or signing request to the certificate authority 190 over the network 150. As one example, the certification request can include the public key portion of the key pair generated at step 302, a signature algorithm identifier, and a digital signature of the application 170. The digital signature of the application 170 can be generated using the private key portion of the key pair generated at step 302. In some cases, the certification request can also include a unique identifier of the client device 160. In response to the signing request from the key operator 174, the certificate authority 190 can return an identity certificate back to the key operator 174 at step 304. The identity certificate issued by the certificate authority 190 certifies the ownership of the public key of the application 170. Among other data fields in the identity certificate, it can also include a copy of the identifier of the client device 160. Alternatively, the key operator 174 can add the identifier of the client device 160 to the identity certificate as a new field after the identity certificate is received from the certificate authority 190.

At step 306, the process can include the key operator 174 querying the management service 130 on the computing environment 100 to authenticate the application 170 with the management service 130. To do so, the key operator 174 can communicate the identity certificate received from the certificate authority 190 at step 304 to the management service 130.

At step 308, the device authenticator 132 can authenticate the application 170 based on the identity certificate received in the query from the key operator 174 at step 306. The device authenticator 132 can authenticate the application 170 in connection with the public key contained in the identity certificate. The authentication can be conducted based on communications with the certificate authority 190 in some cases. The device authenticator 132 can also uniquely identify the client device 160 at step 308 with reference to the unique identifier in the identity certificate and, in some cases, information stored in the device data 122.

At step 310, the process can include the key exchanger 134 storing the public key for the application 170, which was received in the query from the key operator 174 at step 306, into the data store 120. For example, the key exchanger 134 can store the identity certificate received at step 306, which includes the public key for the application 170, in the table 124A of the data store 120. As noted above, the table 124A can be specifically reserved by the management service 130 to store the identity certificates of the applications executing on the client device 160. The applications executing on the client device 160 can be distinguished from those executing on other client devices based on the unique identifier for the client device 160 received in the identity certificate at step 306.

At step 312, the process can include the key exchanger 134 forwarding the public keys stored in the table 124A back to the key operator 174 of the application 170. Here, the key exchanger 134 can review the data records stored in the table 124A to find any identity certificates, including public keys, of applications other the application 170 that are known to be executing on the client device 160. Depending upon the order in which applications are installed on the client device 160 (and the order in which the management service 130 authenticates and creates records for them), the number of records stored in the table 124A may vary. In any case, the key exchanger 134 is directed at step 312 to find the records of all the applications executing on the client device 160 and to communicate them to back to the application 170. From the data contained in the records, the key exchanger 134 can forward back the identity certificates, the public keys, or both the identity certificates and the public keys of the applications executing on the client device 160, among other relevant data.

At step 314, the process can include the key operator 174 of the application 170 obtaining the data records forwarded from the key exchanger 134 at step 312. Thus, in response to the key operator 174 querying the management service 130 at step 306, the key operator 174 can receive the identity certificates and public keys of other applications executing on the client device 160 from the key exchanger 134. In that way, the application 170 can obtain copies of the public keys of the other applications executing on the client device 160. The key operator 174 can also request the identity certificates of other applications executing on the client device 160 from the management service 130 at any other time.

At step 316, the process can include the key operator 174 storing data from the records received at step 314 in the key store 176. The data can include the identity certificates and public keys of other applications executing on the client device 160. At this point, the key store 176 can include a number of records for the applications executing on the client device 160, similar to those shown in FIG. 2.

At step 318, the process can include the key operator 174 confirming a revocation status of the identity certificates and the public keys stored in the key store 176. Identity certificates issued by the certificate authority 190 for the applications executing on the client device 160 are typically valid until their validity times have been reached. From the time of validity, each identity certificate is valid until its expiration date. Certain circumstances may cause a certificate to become invalid before the expiration of the validity period, such as a change of association with the certificate authority 190, suspected compromise of a private key, or other reasons. In those cases, the certificate authority 190 may revoke identity certificates, including those issued to the applications 170 and 180, among others executing on the client device 160.

Thus, at step 318, the key operator 174 confirms whether the identity certificates obtained at step 314 are still valid or use, before using the public keys contained within them to perform cryptographic operations. The key operator 174 can confirm the revocation status of the public keys stored in the key store 176 through a certificate status protocol communication with the certificate authority 190. The key operator 174 can confirm the revocation status of each of the public keys individually or confirm the status of multiple public keys through reference to a certificate revocation list (CRL) stored by the certificate authority 190.

At step 320, the process can include the key operator 174 caching or storing, in the key store 176, the revocation status information obtained at step 318. The revocation status information for each record or public key can be stored in the key store 176, similar to the way the revocation status data 210B-210N shown in FIG. 2 is stored individually for the public keys 200C-200N. The revocation status for each public key can be based on a time to live (TTL) parameter received through the certificate status protocol communication at step 318.

After step 320, the application 170 has obtained the public keys of the other applications executing on the client device 160 and is ready to conduct secure inter-application data communications with them. The other applications executing on the client device 160, such as the application 180, also need to obtain the copies of the public keys. Thus, turning to FIG. 3B, the application 180 performs a number of steps similar to those performed by the application 170 in FIG. 3A.

Figure 3B:
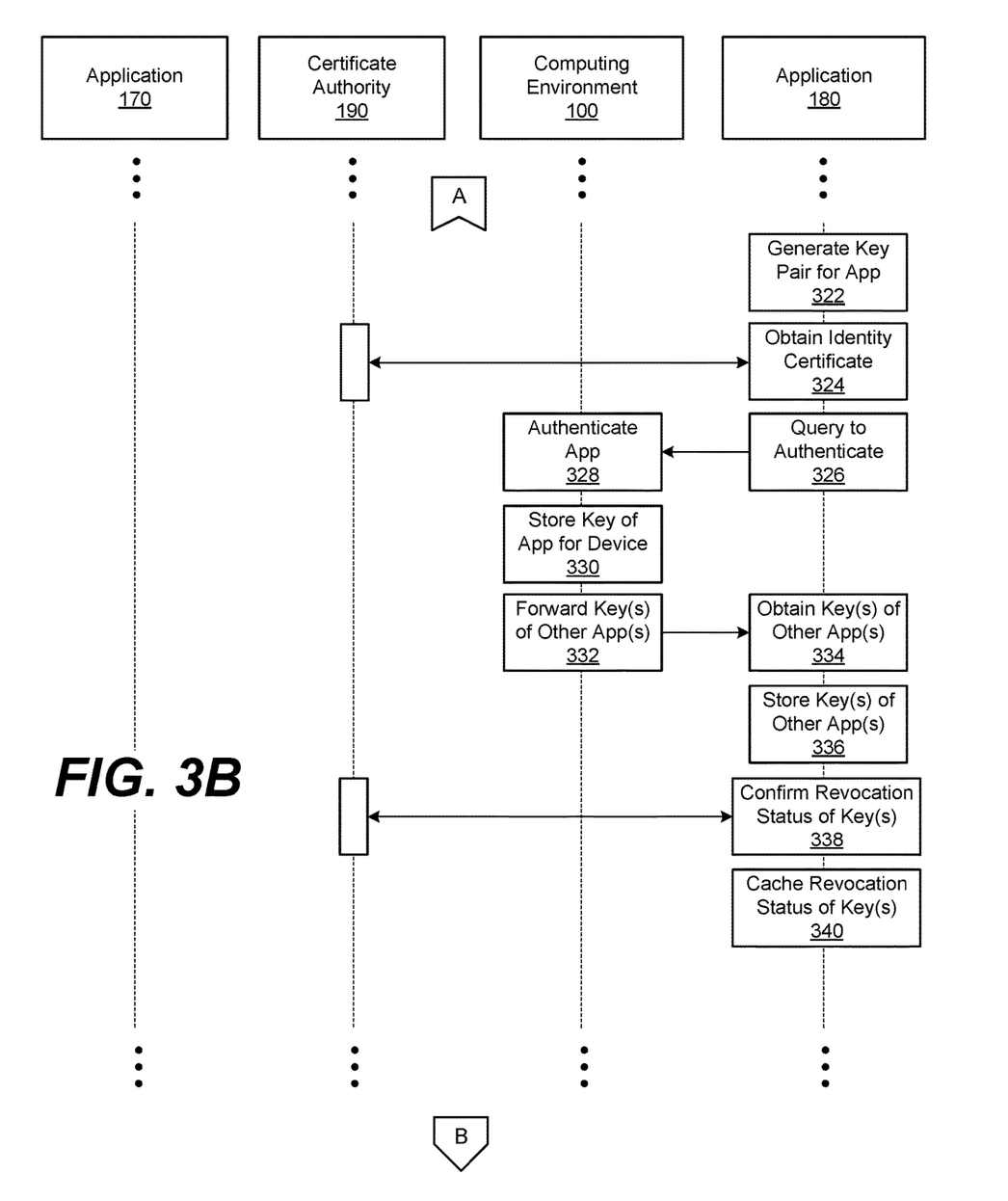
FIG. 3B further illustrates the process for secure inter-application data sharing shown in FIG. 3A according to various examples described herein.

At step 322, the process can include the key pair generator 182 generating an asymmetric key pair for the application 180. Any suitable type or length of key pair can be generated by the key pair generator 182. Using the key pair, the key pair generator 182 can conduct cryptographic operations using one or more cryptosystems, such as the Diffie-Hellman, RSA, and DSA cryptosystems, among others.

At step 324, the process can include the key operator 184 obtaining an identity certificate for the application 180 from the certificate authority 190. To do so, the key operator 184 can submit a certification or signing request to the certificate authority 190 over the network 150. As one example, the certification request can include the public key portion of the key pair generated at step 322, a signature algorithm identifier, and a digital signature of the application 180. The digital signature of the application 180 can be generated using the private key portion of the key pair generated at step 322. In some cases, the certification request can also include a unique identifier of the client device 160. In response to the signing request from the key operator 184, the certificate authority 190 can return an identity certificate back to the key operator 184 at step 324. The identity certificate issued by the certificate authority 190 certifies the ownership of the public key of the application 180. Among other data fields, the identity certificate can include a copy of the identifier of the client device 160. Alternatively, the key operator 184 can add the identifier of the client device 160 to the identity certificate as a new field after the identity certificate is received from the certificate authority 190.

At step 326, the process can include the key operator 184 querying the management service 130 on the computing environment 100 to authenticate the application 180 with the management service 130. To do so, the key operator 184 can communicate, to the management service 130, the identity certificate received from the certificate authority 190 at step 324.

At step 328, the device authenticator 132 can authenticate the application 180 based on the identity certificate received in the query from the key operator 184 at step 326. The device authenticator 132 can authenticate the application 180 in connection with a digital signature contained in the identity certificate. The authentication can be conducted based on communications with the certificate authority 190 in some cases. The device authenticator 132 can also uniquely identify the client device 160 at step 328 with reference to the unique identifier in the identity certificate and, in some cases, information stored in the device data 122.

At step 330, the process can include the key exchanger 134 storing the public key for the application 180, which was received in the query from the key operator 184 at step 326, into the data store 120. For example, the key exchanger 134 can store the identity certificate received at step 326, which includes the public key for the application 180, in the table 124A of the data store 120.

At step 332, the process can include the key exchanger 134 forwarding the public keys stored in the table 124A back to the key operator 184 of the application 180. Here, the key exchanger 134 can review the data records stored in the table 124A to find any identity certificates of applications other the application 180 that are known to be executing on the client device 160, including public keys. The key exchanger 134 is directed at step 332 to find the records of all the applications executing on the client device 160, such as the application 170, and to communicate such records to back to the application 180. The key exchanger 134 can communicate back one or more of the identity certificates or the public keys of the applications executing on the client device 160, among other relevant data.

At step 334, the process can include the key operator 184 of the application 180 obtaining the data records forwarded from the key exchanger 134 at step 332. Thus, in response to the key operator 184 querying the management service 130 at step 326, the key operator 184 can receive the identity certificates and public keys of other applications executing on the client device 160 from the key exchanger 134. In that way, the application 180 can also obtain copies of the public keys of the other applications executing on the client device 160, similar to the way the application 170 did so. The key operator 184 can also request the identity certificates of other applications executing on the client device 160 from the management service 130 at any other time.

At step 336, the process can include the key operator 184 storing data from the records received at step 334 in the key store 186. The data can include the identity certificates and public keys of other applications executing on the client device 160. At this point, the key store 186 can include a number of records for the applications executing on the client device 160, similar to those shown in FIG. 2.

At step 338, the process can include the key operator 184 confirming a revocation status of the identity certificates and the public keys stored in the key store 186. The key operator 184 can confirm the revocation status of the public keys stored in the key store 186 through a certificate status protocol communication with the certificate authority 190. The key operator 184 can confirm the revocation status of each of the public keys individually or confirm the status of multiple public keys through reference to a certificate revocation list (CRL) stored by the certificate authority 190.

At step 340, the process can include the key operator 184 caching or storing, in the key store 186, the revocation status information obtained at step 318. The revocation status information can be stored for each record or public key in the key store 186, similar to the way the revocation status data 210B-210N shown in FIG. 2 is stored individually for the public keys 200C-200N. The revocation status for each public key can be based on a TTL parameter received through the certificate status protocol communication at step 338. The TTL parameter, which may be defined according to a relative or absolute time period, a specified future date, a specified future date and time, or other timeframe, can define the valid lifespan for each record or public key in the key store 186. After step 340, the applications 170 and 180 have exchanged their identity certificates and public keys. The applications 170 and 180 are now capable of conducting secure inter-application data communications with each other according to the steps shown in FIG. 3C.

Figure 3C:
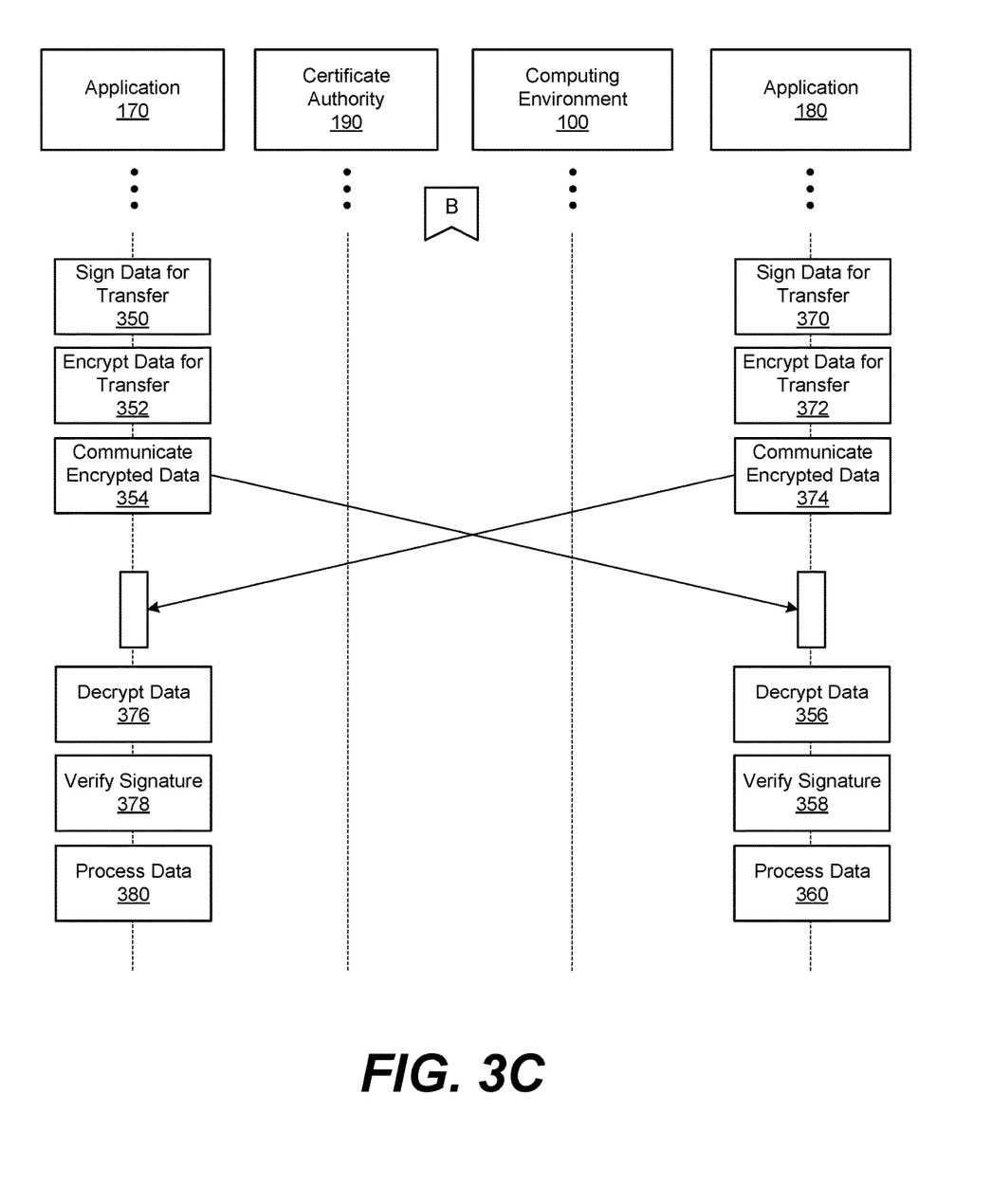
FIG. 3C further illustrates the process for secure inter-application data sharing shown in FIGS. 3A and 3B according to various examples described herein.

At step 350 in FIG. 3C, the process includes the key operator 174 of the application 170 signing the data to be communicated to the application 180. The key operator 174 can conduct the signing operation using the private key of the application 170, and the signing operation can generate a signature of the application 170. The signature can be used by the application 180 to authenticate data communications from the application 170. As an example, the key operator 174 can sign a hash of the data to be communicated to the application 180 with the private key of the application 170. Alternatively, the key operator 174 can directly sign the data to be communicated to the application 180 with the private key of the application 170.

At step 352, the process includes the key operator 174 encrypting the data to be communicated to the application 180 using the public key of the application 180. This encrypting process generates encrypted data for transfer to the application 180 as part of an encrypted data package. The encrypted data package can also include the signature generated at step 350.

At step 354, the process includes the application 170 communicating the encrypted data package generated at steps 350 and 352 to the application 180 through an inter-application communication process. Any type of inter-application or inter-process communication (IPC) supported by the operating system of the client device 160 can be relied upon to communicate the encrypted data package at step 354. Example methods can include memory-based file transfers, socket transfers, message queue transfers, and pipe transfers, among other techniques.

At step 356, the process can include the application 180 decrypting the encrypted data package received from the application 170 at step 354. Particularly, because the data was encrypted by the application 170 using the public key of the application 180 at step 352, the key operator 184 of the application 180 can now decrypt the encrypted data package using its private key.

At step 358, the process can include the application 180 verifying the signature contained within the encrypted data package received at step 354. As one example, the key operator 184 can decrypt the signature in the encrypted data package using the public key of the application 170, which was obtained from the management service 130 (e.g., at step 334 in FIG. 3B). The decrypted signature can be compared to a hash of the data decrypted at step 356 (or the data itself) to confirm that the encrypted data package transferred at step 354 was sent from the application 170. Finally, at step 360, the application 180 can process the data received from the application 170.

The application 170 can also receive encrypted data packages from the application 180. As shown at step 370, the process includes the key operator 184 of the application 180 signing data to be communicated to the application 170. The key operator 184 can conduct the signing operation using the private key of the application 180, and the signing operation can generate a signature of the application 180. The signature can be used by the application 170 to authenticate data communications from the application 180. As an example, the key operator 184 can sign a hash of the data to be communicated to the application 170 with the private key of the application 180. Alternatively, the key operator 184 can directly sign the data to be communicated to the application 170 with the private key of the application 180.

At step 372, the process includes the key operator 184 encrypting the data to be communicated to the application 170 using the public key of the application 170. This encrypting process generates encrypted data for transfer to the application 170 as part of an encrypted data package. The encrypted data package can also include the signature generated at step 370.

At step 374, the process includes the application 180 communicating the encrypted data package generated at steps 370 and 372 to the application 170 through any type of inter-application or inter-process communication process supported by the operating system of the client device 160. Example methods can include memory-based file transfers, socket transfers, message queue transfers, and pipe transfers, among other techniques.

At step 376, the process can include the application 170 decrypting the encrypted data package received from the application 180 at step 374. Particularly, because the data was encrypted by the application 180 using the public key of the application 170 at step 352, the key operator 174 of the application 170 can now decrypt the encrypted data package using its private key.

At step 378, the process can include the application 170 verifying the signature contained within the encrypted data package received at step 374. As one example, the key operator 174 can decrypt the signature in the encrypted data package using the public key of the application 180, which was obtained from the management service 130 (e.g., at step 314 in FIG. 3A). The decrypted signature can be compared to a hash of the data decrypted at step 376 (or the data itself) to confirm that the encrypted data package transferred at step 374 was sent from the application 180.

Other applications executing on the client device 160 can securely communicate with each other and with the applications 170 and 180 according to the concepts outlined above. The embodiments provide a mechanism for secure inter-application communications between a number of different processes or applications executing on the same computing device.

The flowcharts in FIGS. 3A-3C show examples of the functions and operations of the components described herein. The components described herein can be embodied in hardware, software, or a combination of hardware and software. If embodied in software, each element can represent a module or group of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

The computing environment 100 can include at least one processing circuit. Such a processing circuit can include, for example, one or more processors and one or more storage or memory devices coupled to a local interface. The local interface can include, for example, a data bus with an accompanying address/control bus or any other suitable bus structure. Similarly, the client device 160 can include at least one processing circuit. Such a processing circuit can include, for example, one or more processors and one or more storage or memory devices coupled to a local interface.

The storage or memory devices can store data or components that are executable by the processors of the processing circuit. For example, the management service 30 and/or other components can be stored in one or more storage devices and be executable by one or more processors in the computing environment 100. Similarly, the applications 170 and 180 and/or other components can be stored in one or more storage devices and be executable by one or more processors in the client device 160.

The management service 130, application 170, application 180, and/or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including the management service 130, application 170, application 180, and/or other components can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A method for secure data sharing between applications in a computing device, comprising:
   obtaining, by a first application executed by the computing device, an identity certificate associated with the first application, wherein the identity certificate comprises: a unique identifier associated with the computing device, and a public key associated with the first application;
   authenticating the first application with a management computing environment, over a computer network, using the identity certificate associated with the first application and the unique identifier associated with the computing device;
   obtaining a plurality of public keys from the management computing environment in response to authenticating the first application with the management computing environment, the plurality of public keys being associated with a plurality of other applications known to the management computing environment to be executing on the computing device;
   causing the plurality of public keys obtained from the management computing environment to be stored in a key store of the computing device;
   causing, by the first application, an encrypted data package to be generated using a public key associated with a second application among the plurality of other applications; and
   causing, by the first application, the encrypted data package to be communicated to the second application through an inter-application communication process.

2. The method according to claim 1, further comprising:
   prior to causing the encrypted data package to be generated, confirming a revocation status of the public key associated with the second application through a certificate status protocol communication; and
   causing the revocation status of the public key associated with the second application to be cached in the key store of the computing device.

3. The method according to claim 2, further comprising:
   causing the revocation status to be cached for a length of time based on a time to live (TTL) parameter received through the certificate status protocol communication.

4. The method according to claim 1, wherein the encrypted data package includes a signature of the first application.

5. The method according to claim 4, further comprising:
   generating, by the first application, a key pair, the key pair comprising the public key associated with the first application and a private key associated with the first application; and
   signing a hash of data in the encrypted data package with the private key associated with the first application to generate the signature of the first application.

6. The method according to claim 1, wherein obtaining the identity certificate for the first application comprises sending a certificate signing request to a certificate authority.

7. The method according to claim 1, further comprising:
   receiving, by the first application, a second encrypted data package, the second encrypted data package being generated by a second application executed by the computing device; and
   decrypting the second encrypted data package using a private key associated with the first application.

8. The method according to claim 7, further comprising:
   verifying a signature of the second application to determine an identity of second the application.

9. A non-transitory computer-readable medium embodying program code for secure data sharing between applications that, when executed by a computing device, directs the computing device to at least:
   obtain, by a first application executed by the computing device, an identity certificate associated with the first application, wherein the identity certificate comprises: a unique identifier associated with the computing device, and a public key associated with the first application;
   authenticate the first application with a management computing environment, over a computer network, using the identity certificate associated with the first application and the unique identifier associated with the computing device;
   obtain a plurality of public keys from the management computing environment in response to authentication of the first application with the management computing environment, the plurality of public keys being associated with a plurality of other applications known to the management computing environment to be executing on the computing device;

cause the plurality of public keys obtained from the management computing environment to be stored in a key store of the computing device;

cause, by the first application, an encrypted data package to be generated using a public key associated with a second application among the plurality of other applications; and cause, by the first application, the encrypted data package to be communicated to the second application through an inter-application communication process.

10. The non-transitory computer-readable medium according to claim 9, wherein the computing device is further directed to at least:

confirm a revocation status of the public key associated with the second application through a certificate status protocol communication; and cause the revocation status of the public key associated with the second application to be cached in the key store of the computing device.

11. The non-transitory computer-readable medium according to claim 10, wherein the computing device is further directed to at least:

cause the revocation status to be cached for a length of time based on a time to live (TTL) parameter received through the certificate status protocol communication.

12. The non-transitory computer-readable medium according to claim 9, wherein the encrypted data package includes a signature of the first application.

13. The non-transitory computer-readable medium according to claim 12, wherein the computing device is further directed to at least:

generate, by the first application, a key pair, the key pair comprising the public key associated with the first application and a private key associated with the first application; and sign a hash of data in the encrypted data package with the private key associated with the first application to generate the signature of the first application.

14. The non-transitory computer-readable medium according to claim 9, wherein the computing device is further directed to at least:

receive, by the first application, a second encrypted data package, the second encrypted data package being generated by a second application executed by the computing device; and decrypt the second encrypted data package using a private key associated with the first application.

15. The non-transitory computer-readable medium according to claim 14, wherein the computing device is further directed to at least:

verify a signature of the second application to determine an identity of second the application.

16. A computing device for secure data sharing between applications, comprising:

a memory device configured to store computer-readable instructions thereon; and at least one processing device configured, through execution of the computer-readable instructions, to direct the computing device to at least:

obtain, by a first application executed by the computing device, an identity certificate associated with the first application, wherein the identity certificate comprises: a unique identifier associated with the computing device, and a public key associated with the first application;

authenticate the first application with a management computing environment, over a computer network, using the identity certificate associated with the first application and the unique identifier associated with the computing device;

obtain a plurality of public keys from the management computing environment in response to authentication of the first application with the management computing environment, the plurality of public keys being associated with a plurality of other applications known to the management computing environment to be executing on the computing device;

cause the plurality of public keys obtained from the management computing environment to be stored in a key store of the computing device;

cause, by the first application, an encrypted data package to be generated using a public key associated with a second application among the plurality of other applications; and cause, by the first application, the encrypted data package to be communicated to the second application through an inter-application communication process.

17. The computing device according to claim 16, wherein the computing device is further configured to at least:

confirm a revocation status of the public key associated with the second application through a certificate status protocol communication; and cause the revocation status of the public key associated with the second application to be cached in the key store of the computing device.

18. The computing device according to claim 17, wherein the computing device is further directed to at least:

cause the revocation status to be cached for a length of time based on a time to live (TTL) parameter received through the certificate status protocol communication.

19. The computing device according to claim 16, wherein the encrypted data package includes a signature of the first application.

20. The computing device according to claim 19, wherein the computing device is further directed to at least:

generate, by the first application, a key pair, the key pair comprising the public key associated with the first application and a private key associated with the first application; and sign a hash of data in the encrypted data package with the private key associated with the first application to generate the signature of the first application.

* * * * *